US011848441B2

(12) United States Patent
Kamada et al.

(10) Patent No.: US 11,848,441 B2
(45) Date of Patent: Dec. 19, 2023

(54) ZINC FOIL, PRIMARY BATTERY NEGATIVE ELECTRODE ACTIVE MATERIAL USING SAME, AND ZINC FOIL PRODUCTION METHOD

(71) Applicant: MITSUI MINING & SMELTING CO., LTD., Tokyo (JP)

(72) Inventors: Tsuneyoshi Kamada, Tokyo (JP); Naoki Kumada, Takehara (JP); Masashi Sakano, Takehara (JP); Hidetoshi Inoue, Takehara (JP); Hideyuki Nagaoka, Takehara (JP); Yasuhiro Ochi, Takehara (JP)

(73) Assignee: Mitsui Mining & Smelting Co., Ltd.

( * ) Notice: Subject to any disclaimer, the term of this patent is extended or adjusted under 35 U.S.C. 154(b) by 288 days.

(21) Appl. No.: 17/279,007

(22) PCT Filed: Oct. 1, 2019

(86) PCT No.: PCT/JP2019/038713
§ 371 (c)(1),
(2) Date: Mar. 23, 2021

(87) PCT Pub. No.: WO2020/071350
PCT Pub. Date: Apr. 9, 2020

(65) Prior Publication Data
US 2022/0037654 A1 Feb. 3, 2022

(30) Foreign Application Priority Data
Oct. 3, 2018 (JP) ................. 2018-187888

(51) Int. Cl.
*H01M 4/42* (2006.01)
*C22C 18/00* (2006.01)
*C25D 3/56* (2006.01)
(52) U.S. Cl.
CPC ............ *H01M 4/42* (2013.01); *C22C 18/00* (2013.01); *C25D 3/565* (2013.01)

(58) Field of Classification Search
CPC ............ C22C 18/00; C25D 3/565; H01M 4/42
See application file for complete search history.

(56) References Cited

U.S. PATENT DOCUMENTS

2008/0170962 A1    7/2008   Shimamura et al.

FOREIGN PATENT DOCUMENTS

| CN | 103233141 A | 8/2013 |
|----|-------------|--------|
| EP | 0688056 A1 | 12/1995 |
| JP | 2000-058045 A | 2/2000 |
| JP | 2008-171762 A | 7/2008 |
| JP | 2010-118286 A | 5/2010 |
| WO | 2005-064713 A1 | 7/2005 |
| WO | 2006-040857 A1 | 4/2006 |

OTHER PUBLICATIONS

International Search Report (English and Japanese) of the International Searching Authority issued in PCT/JP2019/038713, dated Dec. 17, 2019; ISA/JP (3 pages).

*Primary Examiner* — Jessee R Roe
(74) *Attorney, Agent, or Firm* — Harness, Dickey & Pierce, P.L.C.

(57) ABSTRACT

A zinc foil is provided that can be used as a negative electrode active material, and in a battery including the zinc foil as a negative electrode active material, the amount of gas generated during long term storage of the battery is reduced as compared with that in a battery including a conventional zinc foil. The zinc foil contains zinc as a main material and bismuth. The bismuth content is 100 ppm or more and 10000 ppm or less on a mass basis. The zinc crystal grain size is 0.2 μm or more and 8 μm or less. The bismuth crystal grain size is less than 1000 nm, as measured in a backscattered electron image obtained using a scanning electron microscope. The zinc foil is free of aluminum and/or lead, or even if the zinc foil contains aluminum and/or lead, the aluminum content is 1% or less on a mass basis and/or the lead content is 200 ppm or less on a mass basis.

10 Claims, 4 Drawing Sheets

Fig. 3A  Example 6
Bismuth crystal grain size
Size at 50% in cumulative volume distribution(Heywood diameter : Equivalent circular diameter)

Distribution : Volume distribution
Reference data : Heywood diameter

| mv | ma | mn | sd | cs |
|---|---|---|---|---|
| 129.8 | 82.61 | 32.75 | 69.24 | 0.07363 |

| (%) | Size (nm) |
|---|---|
| 10 | 33.19 |
| 20 | 48.32 |
| 30 | 88.04 |
| 40 | 157.2 |
| 50 | 161.2 |
| 60 | 165.4 |
| 70 | 169.7 |
| 80 | 174 |
| 90 | 178.5 |
| 100 | 183.1 |

Fig. 3B  Comparative Example 3
Bismuth crystal grain size
Size at 50% in cumulative volume distribution(Heywood diameter : Equivalent circular diameter)

Distribution : Volume distribution
Reference data : Heywood diameter

| mv | ma | mn | sd | cs |
|---|---|---|---|---|
| 1.934 | 1.898 | 1.796 | 0.2241 | 3.162 |

| (%) | Size ($\mu$m) |
|---|---|
| 10 | 1.648 |
| 20 | 1.778 |
| 30 | 1.825 |
| 40 | 1.877 |
| 50 | 1.93 |
| 60 | 1.985 |
| 70 | 2.041 |
| 80 | 2.14 |
| 90 | 2.296 |
| 100 | 2.464 |

ZINC FOIL, PRIMARY BATTERY NEGATIVE ELECTRODE ACTIVE MATERIAL USING SAME, AND ZINC FOIL PRODUCTION METHOD

CROSS REFERENCE TO RELATED APPLICATIONS

This application is a U.S. National Phase Application under 35 U.S.C. 371 of International Application No. PCT/JP2019/038713, filed on Oct. 1, 2019, which claims priority to Japanese Patent Application No. 2018-187888, filed on Oct. 3, 2018. The above applications are hereby incorporated by reference herein in their entirety.

BACKGROUND

Technical Field

The present invention relates to a zinc foil. The present invention also relates to a negative electrode active material for a primary battery including a zinc foil, and a method for producing a zinc foil.

Related Art

Conventionally, lead or cadmium is added to zinc used as a negative electrode active material in a primary battery for the purpose of both suppressing the generation of gas during long term storage of the battery and providing high discharge performance. However, with growing environmental awareness, the use of lead and cadmium is being avoided, and the use of bismuth in place of these elements has been proposed. For example, JP 2008-171762A discloses a manganese battery in which bismuth has precipitated at the boundaries of zinc crystal grains forming a zinc can for the negative electrode.

WO 2005/064713 discloses a bottomed cylindrical can for a negative electrode for a battery, and the can is obtained by subjecting a zinc sheet to rolling and impact extrusion molding, the zinc sheet containing 0.01 mass % or more and 0.7 mass % or less of bismuth, 1 ppm or less of antimony, 70 ppm or less of lead, and 20 ppm or less of cadmium.

SUMMARY

The generation of gas can be suppressed to a certain level by using a negative electrode material obtained by adding bismuth to zinc, but a satisfactory level has not yet been reached. Particularly in a thin primary battery with a thickness of several millimeters or less, even a small amount of gas generated may increase the thickness significantly.

Accordingly, it is an object of the present invention to provide a zinc negative electrode active material that can overcome various disadvantages of the conventional techniques described above.

The present invention provides a zinc foil containing zinc as a main material and bismuth, the zinc foil having a bismuth content of 100 ppm or more and 10000 ppm or less on a mass basis, and a zinc crystal grain size of 0.2 µm or more and 8 µm or less.

The present invention also relates to a negative electrode active material for a primary battery, the negative electrode active material including a zinc foil containing zinc as a main material and bismuth. The zinc foil has a bismuth content of 100 ppm or more and 10000 ppm or less on a mass basis, and a zinc crystal grain size of 0.2 µm or more and 8 µm or less.

Furthermore, the present invention also relates to a method for producing a zinc foil, the method including: precipitating a zinc foil containing zinc as a main material and bismuth through reduction on a cathode immersed in an electrolyte solution containing a zinc source and a bismuth source, wherein a current density in the reduction is 1000 $A/m^2$ or more and 10000 $A/m^2$ or less; a dimensionally stable electrode is used as an anode, and the electrolyte solution has a bismuth content of 200 ppm or more and 10000 ppm or less, on a mass basis, relative to a total mass of zinc and bismuth in the electrolyte solution.

Advantageous Effects of Invention

According to the present invention, there can be provided a zinc foil that can be used as a negative electrode active material, and in a battery including the zinc foil as a negative electrode active material, the amount of gas generated during long term storage of the battery is reduced as compared with that in a battery including a conventional zinc foil.

BRIEF DESCRIPTION OF THE DRAWINGS

FIGS. 3A and 3B show the results of analysis of the bismuth crystal grain size at 50% in a cumulative volume distribution in Example 6 and Comparative Example 3, respectively.

DETAILED DESCRIPTION

Figure 1A:
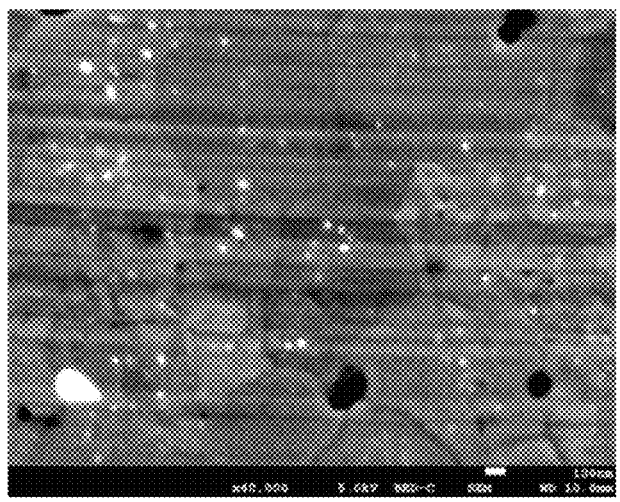
FIG. 1A is the backscattered electron image of the zinc foil obtained in Example 6.

Hereinafter, the present invention will be described by way of a preferred embodiment thereof. The zinc foil according to the present invention contains zinc as the main material and bismuth as an additional element. The expression "zinc as the main material" means that elemental zinc is contained in the zinc foil in an amount of 80 mass % or more. The content of elemental zinc is the remainder excluding bismuth, other additional elements, and impurities, which can be measured using ICP atomic emission spectroscopy. Bismuth is contained in the zinc foil for the purpose of suppressing the generation of gas during storage of a primary battery when the zinc foil of the present invention is used as a negative electrode active material in the battery. The state of the presence of bismuth in the zinc foil is not clear; however, at least, bismuth is not present in the state of a solid solution with zinc. As used herein, the expression "the state of a solid solution" refers to a state in which the crystal structure of zinc has changed in response to the addition of bismuth. A zinc mapping image showing the distribution of zinc in the form of a simple substance and a bismuth mapping image showing the distribution of bismuth in the form of a simple substance can be obtained by elemental mapping on a cross section of the zinc foil of the present invention by energy dispersive X-ray spectroscopy (characteristic X-ray detecting method) using a scanning electron microscope.

A feature of the zinc foil of the present invention is that the distribution of bismuth is uniform as compared with that in a conventionally known bismuth-containing zinc foil. The zinc foil with this feature can further suppress the generation of gas during storage of the battery as compared with the conventional bismuth-containing zinc foil. In the present invention, the size of zinc crystal grains contained in the zinc foil is smaller than that in the conventional zinc foil with a view to uniformly distributing bismuth in the zinc foil. Because zinc and bismuth are incompatible, bismuth is likely to be segregated in the vicinity of the boundaries of zinc crystal grains. If the zinc crystal grain size is large, it is found that bismuth is distributed nonuniformly, when observed at a magnification that makes grain boundaries visible. Conversely, if the zinc crystal grain size is small, it is found that bismuth is distributed uniformly, when observed at a magnification that makes grain boundaries visible. For this reason, in the zinc foil of the present invention, the crystal grain size is set to be smaller than that in the conventional zinc foil.

As disclosed in JP 2008-171762A and WO 2005/064713, a bismuth-containing zinc foil is conventionally produced by rolling a casting made of bismuth-containing zinc. When bismuth-containing zinc is produced through casting, the growth of zinc crystal grains proceeds due to cooling conditions, and it is therefore not easy to produce small-sized crystal grains. As a result, bismuth precipitates in the vicinity of the boundaries of large-sized zinc crystal grains, and when observed at a magnification that makes grain boundaries visible, it is found that bismuth is distributed nonuniformly. In contrast, the zinc foil is produced using an electrolysis method, which will be described later, in the present invention. Accordingly, the present invention has made it possible for the first time to easily produce small-sized zinc crystal grains and distribute bismuth as uniformly as possible.

The distribution of bismuth in the zinc foil of the present invention can be determined based on a bismuth mapping image obtained by energy dispersive X-ray spectroscopy (hereinafter also referred to as "EDS") using a scanning electron microscope (hereinafter also referred to as "SEM"). To be specific, bismuth is uniformly distributed such that, in a mapping image with a virtual grid of squares each having a side length of 300 nm, bismuth is observed preferably in 2% N or more, more preferably in 5% N or more, and even more preferably in 10% N or more of the squares relative to the total number of the squares. Hereinafter, this value may also be referred to as "bismuth abundance percentage". The number of squares is 48 or more.

In view of distributing bismuth as uniformly as possible, the zinc crystal grain size is preferably 0.2 µm or more and 8 µm or less, more preferably 1 µm or more and 6 µm or less, and even more preferably 1.4 µm or more and 5.5 µm or less. In contrast, the zinc crystal grain size in a conventional zinc foil produced using a casting-roll method is as large as, for example, 170.5 µm, which is illustrated in Comparative Example 3 described later. The crystal grain size herein is conceptually different from crystalline size.

The zinc crystal grain size in the zinc foil of the present invention is measured using the following method. For measurement, an FE gun scanning electron microscope (SUPRA 55VP available from Carl Zeiss AG) with an EBSD evaluation system (OIM Analysis available from TSL Solutions, Ltd.), and an attached EBSD analyzer are used. The zinc foil is cut using an ultramicrotome to prepare a sample with a cutting plane exposed, and the sample is subjected to analysis by an EBSD method to obtain image data of a crystalline pattern as viewed in the cutting plane. From the obtained image data, the average crystal grain size (Grain Size (Average)) is determined using an EBSD analysis program (OIM Analysis, available from TSL Solutions, Ltd.), in which "All data" is selected on the analysis menu "Grain Size Quick Chart". In this analysis, boundaries with a misorientation angle of 15° or more are considered as crystal grain boundaries. However, because zinc has a hexagonal close packed structure as a crystalline structure, twin grain boundaries are taken into consideration; specifically, when the misorientation angle of a grain boundary is expressed in terms of a rotation axis and a rotation angle, the grain boundary that satisfies the following condition (I) or (II) is not considered as a crystal grain boundary: (I) the rotation axis is represented by (1) given below and the rotation angle is 94.8±1° and 57±1°; (II) the rotation axis is represented by (2) given below and the rotation angle is 34.8±1° and 64.3±1°. Observation using the scanning electron microscope is performed under the following conditions: an acceleration voltage of 20 kV, an aperture diameter of 60 µm, high current mode, and a sample angle of 70°. Observation magnification, measurement region, and step size may be changed as appropriate according to the crystal grain size.

Math. 1

$$<\bar{1}\,2\,\bar{1}\,0> \tag{1}$$

$$<\bar{1}\,1\,0\,0> \tag{2}$$

In order to effectively suppress the generation of gas during storage of the battery, the bismuth content in the zinc foil is preferably 50 ppm or more and 1% or less, more preferably 100 ppm or more and 10000 ppm or less, even more preferably 100 ppm or more and 6000 ppm or less, even much more preferably 150 ppm or more and 6000 ppm or less, and yet even much more preferably 150 ppm or more and 3000 ppm or less, on a mass basis. The bismuth content in the zinc foil can be measured using an ICP atomic emission spectroscopy. The measurement using the ICP atomic emission spectroscopy may be carried out in accordance with JIS H1110. Specifically, a zinc foil is dissolved in an acidic solution such as hydrochloric acid; thereafter, the concentrations of metals other than zinc, including bismuth, are measured using the ICP atomic emission spectroscopy; and the results are each converted to the content of metal, such as bismuth, in terms of mass with the total concentration of all metals in the solution being regarded as 1.

In the zinc foil of the present invention, bismuth is preferably present over a region extending from the center region to the peripheral region of a zinc crystal grain. Due to a synergistic effect of the combination of such a state of presence of bismuth with the small zinc crystal grain size, bismuth is distributed more uniformly in the zinc foil. As used herein, the term "center region" refers to a circular region of a crystal grain whose center matches the centroid of the crystal grain, the circular region having an area of 10% based on the area of the crystal grain. The term "peripheral region" refers to an annular region with a certain width that includes the grain boundary of the crystal grain and extends for a predetermined distance from the grain boundary toward the inside. The annular region surrounds the center region. The annular region has an area of 10% based on the area of the crystal grain. There is no particular limitation on the distribution of bismuth in a single crystal grain, and bismuth may be present in the crystal grain in a uniformly distributed manner or may be concentrated in a particular region of the crystal grain, as long as bismuth is present over a region extending from the center region to the peripheral region of the zinc crystal grain. In particular, the difference in the concentration distribution of bismuth is preferably small between the center region and the peripheral region of the crystal grain.

As described above, in the zinc foil of the present invention, the zinc crystal grain size is small and bismuth is distributed as uniformly as possible in the zinc crystal grain. From this viewpoint, it is preferable that the bismuth crystal grain size in the zinc crystal grain should also be small. Specifically, the bismuth crystal grain size is preferably less than 1000 nm, more preferably 500 nm or less, and even more preferably 200 nm or less. There is no particular limitation on the lower limit of the bismuth crystal grain size, and a smaller bismuth crystal grain size is more preferable. The bismuth crystal grain size can be measured in a backscattered electron (hereinafter also referred to as "BSE") image obtained using a SEM.

In view of reducing the negative effects such as passivation in a primary battery, it is desirable that the zinc foil of the present invention should be free of aluminum, and in view of reducing the environmental load, it is desirable that the zinc foil of the present invention should be free of lead. Even if the zinc foil of the present invention contains both or either one of these elements, the content of these elements is desirably as low as possible. Specifically, the aluminum content is preferably 1% or less, more preferably 0.1% or less, and even more preferably 0.05% or less, on a mass basis. The lead content is preferably 200 ppm or less, more preferably 100 ppm or less, and even more preferably 50 ppm or less, on a mass basis. The aluminum content and the zinc content in the zinc foil of the present invention can be measured using an ICP atomic emission spectroscopy. Also, it is desirable that the zinc foil of the present invention should be free of cadmium, and even if the zinc foil of the present invention contains cadmium, the cadmium content is desirably as low as possible. In particular, the cadmium content is preferably 10 ppm or less on a mass basis.

It is desirable that the zinc foil of the present invention should be free of aluminum and lead; however, the zinc foil of the present invention may optionally contain a metal element other than aluminum or lead. The optional metal element may be at least one element selected from the group consisting of indium, magnesium, calcium, gallium, tin, barium, and strontium. When such an element is contained in the zinc foil of the present invention, the generation of gas caused by a cathode reaction is further suppressed advantageously. In view of even further suppressing the generation of gas caused by a cathode reaction, the zinc foil of the present invention particularly preferably contains at least one element selected from the group consisting of indium, gallium, and tin, from among the metal elements listed above.

The total content of the optional metal element(s) listed above in the zinc foil of the present invention is preferably 10 ppm or more and 10000 ppm or less, more preferably 20 ppm or more and 1000 ppm or less, and even more preferably 20 ppm or more and 200 ppm or less, in view of enhancing the advantageous effect of further suppressing the generation of gas caused by a cathode reaction. The content of each of these elements can be measured using the same method as that described hereinbefore for the measurement of the aluminum content and the lead content.

The zinc foil of the present invention is a thin zinc foil with a thickness of preferably 10 μm or more and 500 μm or less, more preferably 10 μm or more and 200 μm or less, and even more preferably 25 μm or more and 100 μm or less. The thickness of the zinc foil is measured using a micrometer. Such thin zinc foil is particularly preferably used as a negative electrode material for a thin primary battery. In particular, the zinc foil of the present invention is highly flexible because the zinc crystal grains are small, and as a result, the occurrence of cracks and wrinkles can be suppressed in the zinc foil of the present invention while the zinc foil is thin. Specifically, the folding endurance of the zinc foil of the present invention is preferably 10 or more, more preferably 15 or more, and even more preferably 20 or more, in terms of the number of double bending operation, as determined in accordance with JIS P8115. The number of times of double bending operation until the test piece breaks is counted using a folding endurance tester BE-201MIT available from Tester Sangyo Co., Ltd. under the conditions of a bending angle of 135°, a bending radius of 0.8 mm, a bending speed of 175 rpm, and a load of 500 g.

Next, a preferred method for producing the zinc foil according to the present invention will be described. The zinc foil of the present invention is preferably produced using an electrolysis method. In the electrolysis method, an anode and a cathode are immersed in an electrolyte solution that contains the zinc source so as to precipitate a zinc foil on the cathode. The electrolyte solution that contains the zinc source may be an aqueous solution of zinc sulfate, an aqueous solution of zinc nitrate, an aqueous solution of zinc chloride, or the like. The zinc concentration of the electrolyte solution is preferably 30 g/L or more and 100 g/L or less because an electrolyte solution having such a zinc concentration easily gives a zinc foil having a small crystal grain size. As the anode used in electrolysis, a known dimensionally stable electrode (DSE) is preferably used. Preferable examples of the DSE include a titanium electrode coated with iridium oxide and a titanium electrode coated with ruthenium oxide. On the other hand, there is no particular limitation on the type of the cathode, but a material that does not affect the reduction of zinc is selected for the cathode as appropriate. For example, aluminum can be used.

The electrolyte solution also contains a bismuth source in addition to the zinc source. The concentration of the bismuth source in the electrolyte solution is preferably such that the electrolyte solution has a bismuth content of 200 ppm or more and 10000 ppm or less, on a mass basis, relative to the total mass of zinc and bismuth in the electrolyte solution.

The electrolyte solution may contain another compound in addition to the zinc compound and the bismuth compound. For example, sulfuric acid may be added as the additional compound for the purpose of adjusting the pH of the electrolyte solution.

The current density in the electrolysis is one of the factors that affect the zinc crystal grain size and the distribution of bismuth in the zinc foil to be obtained. To be specific, a current density higher than that in ordinary electrolysis of zinc can give a large number of fine crystals, whereby a zinc foil that has a small crystal grain size can be easily obtained. From this viewpoint, the current density is preferably 1000 $A/m^2$ or more and 10000 $A/m^2$ or less, more preferably 1000 $A/m^2$ or more and 6000 $A/m^2$ or less, and even more preferably 1000 $A/m^2$ or more and 3000 $A/m^2$ or less. In contrast, the current density in conventional methods for producing an electrolytic zinc foil is as low as about 500 A/m$^2$.

The electrolyte solution may be heated or may not be heated during electrolysis. In the case where the electrolyte solution is heated during electrolysis, the temperature of the electrolyte solution is preferably 30° C. or more and 50° C. or less. Electrolysis is performed until the thickness of the zinc foil reaches the intended value.

As a result of reducing and precipitating zinc under the above-described conditions, the intended zinc foil is obtained. The zinc foil thus obtained is preferably used as a negative electrode active material for a primary battery.

EXAMPLES

Hereinafter, the present invention will be described in further detail by way of Examples. However, the scope of the present invention is not limited to Examples given below. Unless otherwise stated, the percent sign "%" used herein means "mass %".

Example 1

(1) Preparation of Electrolyte Solution

Zinc oxide was used as a zinc compound. Bismuth nitrate was used as a bismuth compound. An electrolyte solution was prepared by dissolving zinc oxide and bismuth nitrate in water together with sulfuric acid. The zinc concentration of the electrolyte solution was 50 g/L. The sulfuric acid concentration was 200 g/L, which was the value obtained by converting the total amount of sulfuric acid ions into the amount of $H_2SO_4$. The bismuth concentration was adjusted such that the bismuth content of the zinc foil to be obtained was as shown in Table 1.

(2) Reduction and Precipitation of Zinc

As the anode, a DSE (a titanium electrode coated with iridium oxide) was used. As the cathode, an aluminum plate was used. While the electrolyte solution was heated to 35° C., an electric current was applied between the anode and the cathode. The current density was 3000 A/m$^2$. Electrolysis was performed under these conditions, and a zinc foil with a thickness of 50 μm was obtained.

Examples 2 to 6

Zinc foils were obtained in the same manner as in Example 1, except that the bismuth concentration of the electrolyte solution was adjusted such that the bismuth content of the zinc foil to be obtained was as shown in Table 1.

Examples 7 and 8

Zinc foils were obtained in the same manner as in Example 1, except for the following.

Indium nitrate was further added to the electrolyte solution used in Example 1. The indium concentration was adjusted such that the indium content of the zinc foil to be obtained was as shown in Table 1. Also, the bismuth concentration of the electrolyte solution was adjusted such that the bismuth content of the zinc foil to be obtained was as shown in Table 1.

Comparative Example 1

A zinc foil was obtained in the same manner as in Example 1, except that a bismuth compound was not added to the electrolyte solution, and that the current density was 500 A/m$^2$. The zinc foil did not contain bismuth.

Comparative Example 2

A zinc foil was obtained in the same manner as in Example 1, except that the bismuth concentration was adjusted such that the bismuth content of the zinc foil to be obtained was as shown in Table 1, and that the current density was 500 A/m$^2$.

Comparative Example 3

This comparative example is an example in which a zinc foil was produced using casting and rolling. Pure zinc (purity: 99.99%) was melted at 500° C., and bismuth was added to the molten metal. The amount of bismuth added was such that the bismuth content of the zinc foil to be obtained was as shown in Table 1. The molten metal was poured into a graphite mold (the shape of casting: 10 mm×100 mm×1 mm thickness) to thereby obtain a casting. The casting was then rolled using a 3 ton roll press machine to thereby obtain a zinc foil with a thickness of 50 μm.

Evaluations

For each of the zinc foils obtained in Examples and Comparative Examples, the zinc crystal grain size, the bismuth crystal grain size, the content of each element, and the number of double bending operation were measured using the methods described above. Also, the bismuth content, the distribution of bismuth, and the amount of gas generated from the zinc foil (using two types of electrolyte solutions) were measured using the methods described below. The results are shown in Table 1.

Method for Measuring Bismuth Content

The bismuth content of the zinc foil was measured using an ICP atomic emission spectroscopy. The indium content, the aluminum content, and the lead content of the zinc foil were also measured using an ICP atomic emission spectroscopy.

Method for Checking Distribution of Bismuth (1) Procedure for Observation at Magnification of 2000×

For each of the zinc foils obtained in Examples and Comparative Examples, the surface of the zinc foil was protected with a carbon paste, and the zinc foil was then cut using a microtome to obtain a sample piece with a cutting plane exposed. An SEM image (reflected electron image) of an arbitrarily selected portion of the sample piece was taken at a magnification of 2000× using an FE gun scanning electron microscope (JSM-7900F available from JEOL, Ltd.).

Elemental mapping was performed on the SEM image (reflected electron image) using an FE gun scanning electron microscope (JSM-7900F available from JEOL, Ltd.) and an attached EDS detector (Ultra Dry available from Thermo Fisher Scientific K.K.). The analysis conditions were as follows: an acceleration voltage of 5 kV, a probe current of 0.8 nA, and a mapping resolution of 256×192.

The bismuth abundance percentage was calculated through observing a grid of 48 squares. Each square had a side length of 7 μm. When observed at a magnification of 2000×, the presence of bismuth was confirmed in Comparative Example 3, while the presence of bismuth was not confirmed in Example 6 (not shown in any figure).

(2) Procedure for Observation at Magnification of 40000×

For each of the zinc foils obtained in Examples and Comparative Examples, the surface of the zinc foil was protected with a carbon paste, and the zinc foil was cut using a microtome to obtain a sample piece with a cutting plane exposed. An SEM image (reflected electron image) of an arbitrarily selected portion of the sample piece was taken at a magnification of 40000× using an FE gun scanning electron microscope (JSM-7900F available from JEOL, Ltd.).

Elemental mapping was performed on the SEM image (reflected electron image) in the same manner as in (1).

Figure 1B:
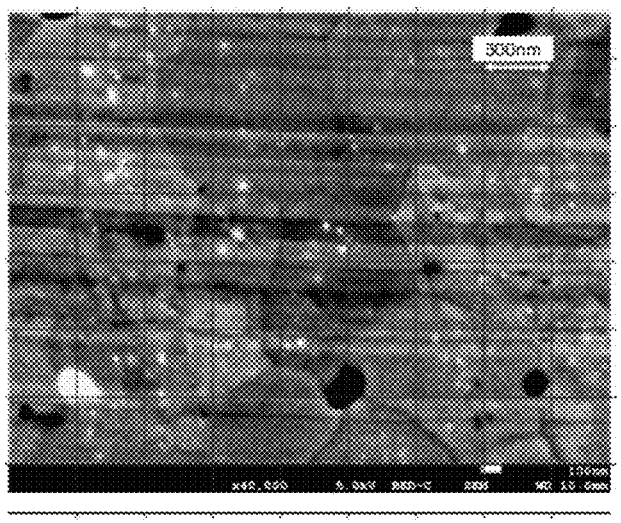
FIG. 1B is the analysis image showing the bismuth abundance percentage in Example 6.

The bismuth abundance percentage was calculated through observing 48 squares. The squares each had a side length of 300 nm. FIG. 1A shows the BSE image of the zinc foil obtained in Example 6. FIG. 1B shows the analysis image that shows the bismuth abundance percentage of the zinc foil obtained in Example 6. As can be clearly seen from FIG. 1, the presence of bismuth was confirmed in Example 6 when observed at a magnification of 40000×.

(3) STEM-EDS Elemental Mapping Analysis

Figure 2A:
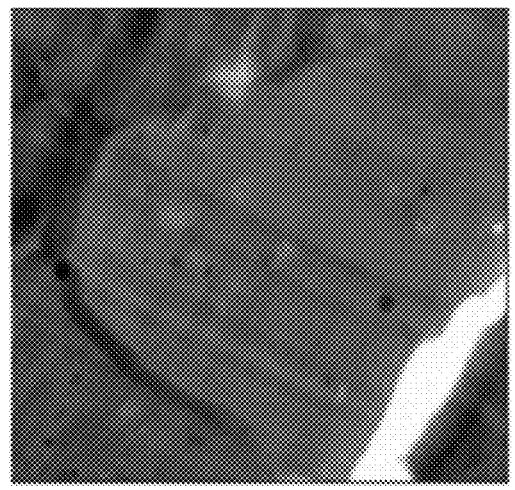
FIGS. 2A and 2B are the STEM image and the bismuth mapping image in Example 6, respectively.
Figure 2B:
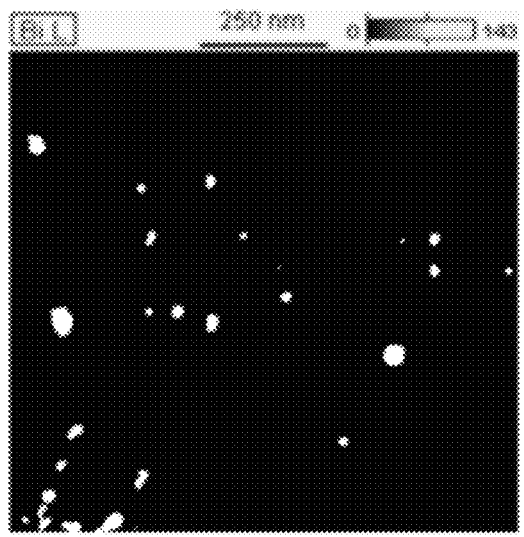

Each of the zinc foils obtained in Examples and Comparative Examples was cut in the thickness direction using an ultramicrotome so as to obtain a sample piece. Elemental mapping was performed on the sample piece using a scanning electron microscope (JEM-ARM200F available from JEOL, Ltd.) and an attached EDS detector (Dry SD100GV available from JEOL, Ltd.) in STEM mode. The conditions for the elemental mapping were as follows: an acceleration voltage of 200 kV, a probe current of 250 pA, and a mapping resolution of 256. The STEM image and the bismuth mapping image in Example 6 are shown in FIGS. 2A and 2B. In the STEM-EDS elemental mapping analysis, it was confirmed that bismuth was present over a region extending from the center region to the peripheral region of a zinc crystal grain.

Bismuth Crystal Grain Size

A BSE image captured by an FE gun scanning electron microscope (JSM-7900F available from JEOL, Ltd.) was analyzed using image analysis software (MAC-VIEW ver. 4 available from Mountech Co., Ltd.) to determine the bismuth crystal grain size. The crystal grain size is the size at 50% in a cumulative volume distribution (Heywood diameter: equivalent circular diameter). FIGS. 3A and 3B show the results of analysis of the size at 50% in the cumulative volume distributions in Example 6 and Comparative Example 3, respectively.

Zinc Crystal Grain Size

The zinc crystal grain size was measured using an FE gun scanning electron microscope (SUPRA 55VP available from Carl Zeiss AG) with an EBSD evaluation system (OIM Analysis available from TSL Solutions, Ltd.), and an attached EBSD analyzer. Sample pieces were prepared by cutting each of the zinc foils obtained in Examples and Comparative Examples in the thickness direction of the zinc foil using an ultramicrotome. Each of the sample pieces was analyzed using an EBSD method to obtain image data of a crystalline pattern.

Figure 4A:
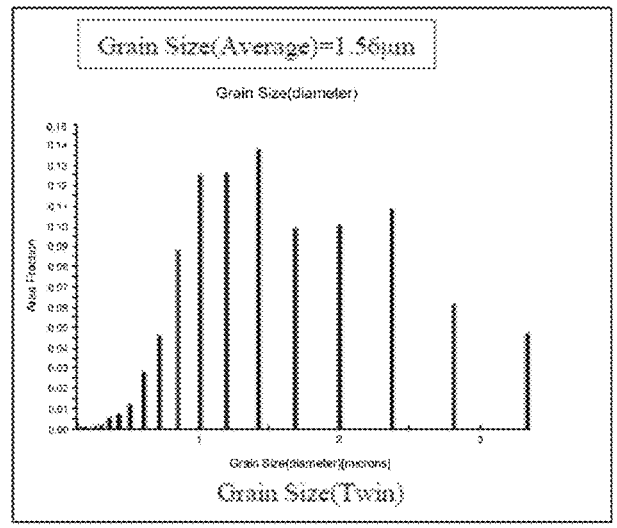
FIGS. 4A and 4B are graphs showing the results of measurement of the zinc crystal grain size in Example 6 and Comparative Example 3, respectively.
Figure 4B:
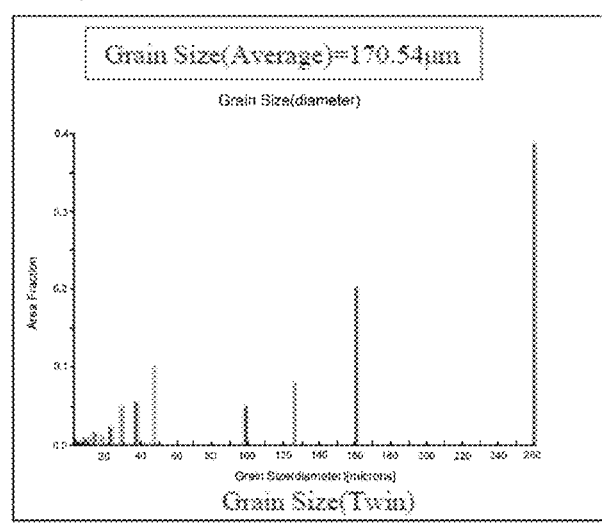

From the image data obtained above, the average crystal grain size was expressed numerically using an EBSD analysis program (OIM Analysis, available from TSL Solutions, Ltd.), in which "All data" was selected on the analysis menu "Grain Size Quick Chart". In this analysis, boundaries with a misorientation angle of 15° or more were considered as crystal grain boundaries. However, because zinc has the hexagonal close packed structure as the crystalline structure, twin grain boundaries were taken into consideration; specifically, when the misorientation angle of a grain boundary was expressed in terms of a rotation axis and a rotation angle, the grain boundary that satisfied the following condition (I) or (II) was not considered as a crystal grain boundary: (I) the rotation axis was represented by <−12-10> and the rotation angle was 94.8±1° and 57±1°; (II) the rotation axis was represented by <−1100> and the rotation angle was 34.8±1° and 64.3±1°. The graphs obtained from the results of analysis are shown in FIGS. 4A and 4B. FIG. 4A shows the result of analysis in Example 6, and FIG. 4B shows the result of analysis in Comparative Example 3.

Amount of Gas Generated

As the electrolyte solutions, a 20% ammonium chloride aqueous solution and a 38% potassium hydroxide aqueous solution were used. The zinc foil was immersed in the electrolyte solution and left at 45° C. for 3 days. The amount of hydrogen gas generated during this period was measured using a glass cell. The results of measurement were converted to the amount of gas generated per day and per unit area.

TABLE 1

| | | Elemental analysis | | | | Zinc crystal grain size | Presence of Bi | | Bismuth abundance percentage (%) | | Bismuth crystal grain size | Number of double bending | Amount of gas generated (μL/cm$^2$/d) | |
|---|---|---|---|---|---|---|---|---|---|---|---|---|---|---|
| | | Bi | In | Al | Pb | | | | Magnification | Magnification | | | | |
| | | (ppm) | (ppm) | (%) | (ppm) | (μm) | Periphery | Center | of 2000× | of 40000× | (nm) | operation | NH$_4$Cl | KOH |
| Example | 1 | 220 | — | 0.02 | 40 | 5.2 | Yes | Yes | Not observed | 6 | 41 | 85 | 70 | — |
| | 2 | 480 | — | 0.02 | 30 | 4.9 | Yes | Yes | Not observed | 20 | 34 | 80 | 37 | 3 |
| | 3 | 700 | — | 0.02 | 30 | 4.1 | Yes | Yes | Not observed | 9 | 33 | 76 | 21 | — |
| | 4 | 1430 | — | 0.01 | 30 | 3.7 | Yes | Yes | Not observed | 19 | 43 | 62 | 14 | 2 |
| | 5 | 2200 | — | 0.01 | 30 | 3.1 | Yes | Yes | Not observed | 28 | 36 | 55 | 14 | 2 |
| | 6 | 5010 | — | 0.01 | 20 | 1.6 | Yes | Yes | Not observed | 83 | 161 | 30 | 14 | 2 |
| | 7 | 1450 | 30 | 0.02 | 30 | 3.9 | Yes | Yes | Not observed | 9 | 33 | 50 | 8 | — |
| | 8 | 1500 | 150 | 0.02 | 30 | 3.9 | Yes | Yes | Not observed | 26 | 40 | 35 | 9 | — |
| Comparative Example | 1 | 0 | — | 0.02 | 40 | 9.5 | No | No | — | — | — | 85 | 140 | — |
| | 2 | 90 | — | 0.02 | 30 | 8.2 | Yes | Yes | Not observed | 3 | 31 | 82 | 82 | — |
| | 3 | 5020 | — | <0.01 | 20 | 170.5 | Yes | No | 13 | Not observed | 1930 | — | 710 | 80 |

As clear from the results shown in Table 1, the zinc foils obtained in Examples have a zinc crystal grain size smaller than those of the zinc foils obtained in Comparative Examples. It can be seen that for this reason, bismuth is distributed uniformly in the zinc foils of Examples as compared with that in the zinc foils of Comparative Examples, and that as a result, the amount of gas generated is reduced.

The invention claimed is:

1. A zinc foil comprising zinc as a main material and bismuth, the zinc foil having a bismuth content of 100 ppm or more and 10000 ppm or less on a mass basis, and a zinc crystal grain size of 0.2 μm or more and 8 μm or less, wherein a bismuth crystal grain size is less than 1000 nm, as measured in a backscattered electron image obtained using a scanning electron microscope.

2. The zinc foil according to claim 1, wherein, in a bismuth mapping image with a virtual grid of squares each having a side length of 300 nm, bismuth is observed in 2% N or more of the squares relative to a total number of the squares, the bismuth mapping image being obtained by energy dispersive X-ray spectroscopy using a scanning electron microscope.

3. The zinc foil according to claim 1, wherein the zinc foil is free of aluminum and/or lead, or even if the zinc foil contains aluminum and/or lead, an aluminum content is 1% or less on a mass basis and/or a lead content is 200 ppm or less on a mass basis.

4. The zinc foil according to claim 1, wherein the bismuth content is 150 ppm or more and 6000 ppm or less on a mass basis.

5. The zinc foil according to claim 1, wherein the zinc foil further contains at least one element selected from the group consisting of indium, magnesium, calcium, gallium, tin, barium, and strontium, and a total content of the at least one element is 10 ppm or more and 10000 ppm or less on a mass basis.

6. The negative electrode active material for a primary battery according to claim 1, wherein the zinc foil is free of aluminum and/or lead, or even if the zinc foil contains aluminum and/or lead, an aluminum content is 1% or less on a mass basis and/or a lead content is 200 ppm or less.

7. The zinc foil according to claim 1, wherein the zinc foil has a folding endurance of 10 or more, in terms of the number of double bending operation, as determined in accordance with JIS P8115.

8. A negative electrode active material for a primary battery, comprising a zinc foil, the zinc foil comprising zinc as a main material and bismuth, the zinc foil having a bismuth content of 100 ppm or more and 10000 ppm or less on a mass basis, and a zinc crystal grain size of 0.2 μm or more and 8 μm or less, wherein a bismuth crystal grain size is less than 1000 nm, as measured in a backscattered electron image obtained using a scanning electron microscope.

9. The negative electrode active material for a primary battery according to claim 8, wherein, in a bismuth mapping image with a virtual grid of squares each having a side length of 300 nm, bismuth is observed in 2% N or more of the squares relative to a total number of the squares, the bismuth mapping image being obtained by energy dispersive X-ray spectroscopy using a scanning electron microscope.

10. A method for producing a zinc foil, the method comprising:

precipitating a zinc foil containing zinc as a main material and bismuth through reduction on a cathode immersed in an electrolyte solution containing a zinc source and a bismuth source, wherein a current density in the reduction is 1000 A/m$^2$ or more and 10000 A/m$^2$ or less;

a dimensionally stable electrode is used as an anode, the electrolyte solution has a bismuth content of 200 ppm or more and 10000 ppm or less, on a mass basis, relative to a total mass of zinc and bismuth in the electrolyte solution, a bismuth crystal grain size is less than 1000 nm, as measured in a backscattered electron image obtained using a scanning electron microscope.

\* \* \* \* \*